Oct. 18, 1932.  A. L. BAUSMAN ET AL  1,883,482
CONFECTION MAKING APPARATUS
Filed Jan. 28, 1930   6 Sheets-Sheet 3
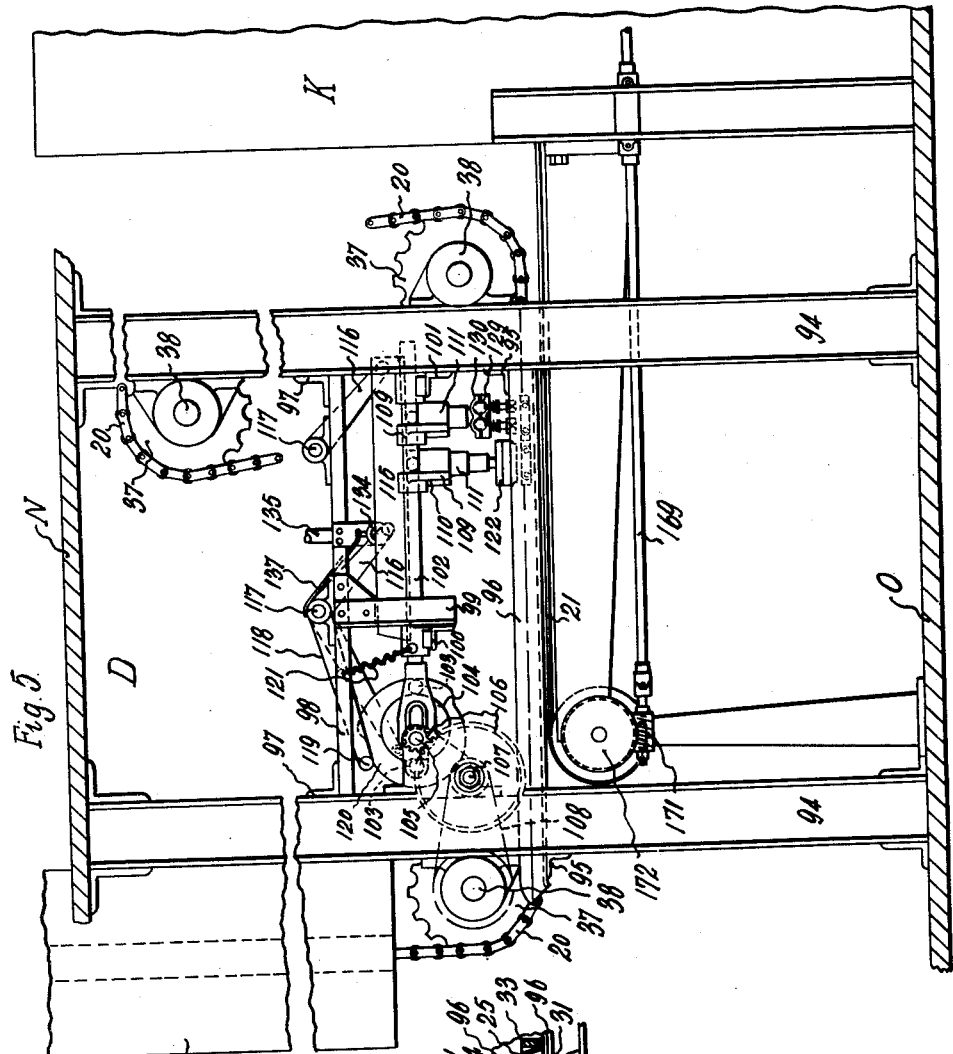
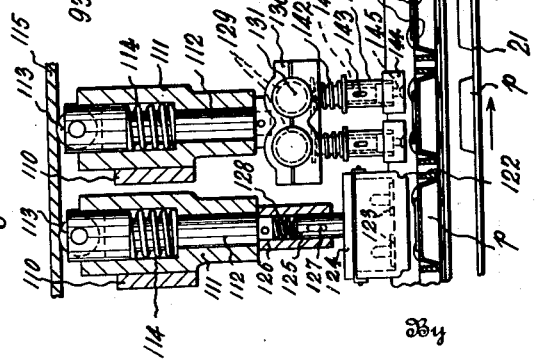
Inventors
Alonzo Linton Bausman
and
Howard C. Baum
By Chapin & Neal
Attorney Oct. 18, 1932.  A. L. BAUSMAN ET AL  1,883,482
CONFECTION MAKING APPARATUS
Filed Jan. 28, 1930    6 Sheets-Sheet 4

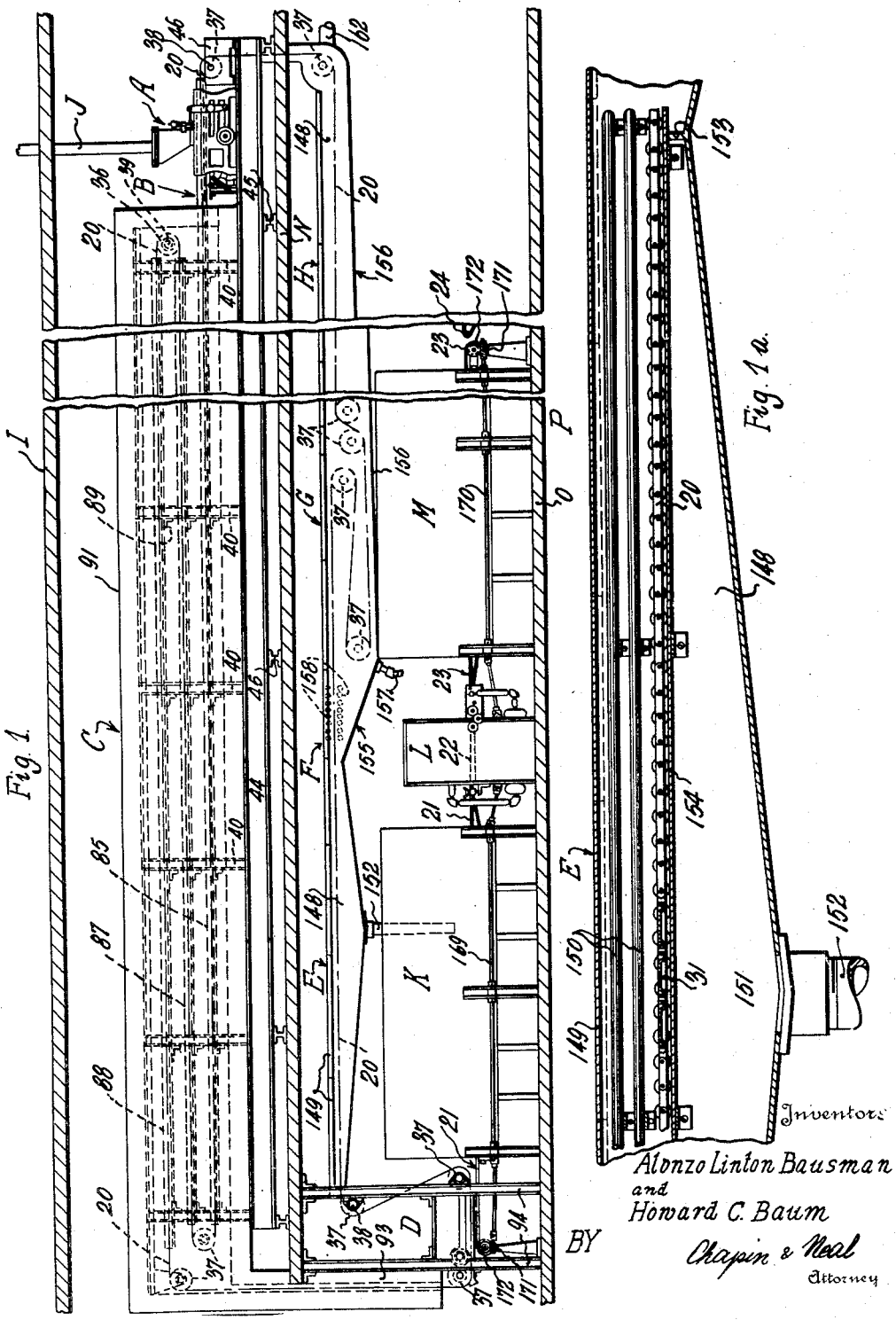
Oct. 18, 1932. A. L. BAUSMAN ET AL 1,883,482
CONFECTION MAKING APPARATUS
Filed Jan. 28, 1930 6 Sheets-Sheet 1
Inventors
Alonzo Linton Bausman
and
Howard C. Baum
BY Chapin & Neal
Attorney

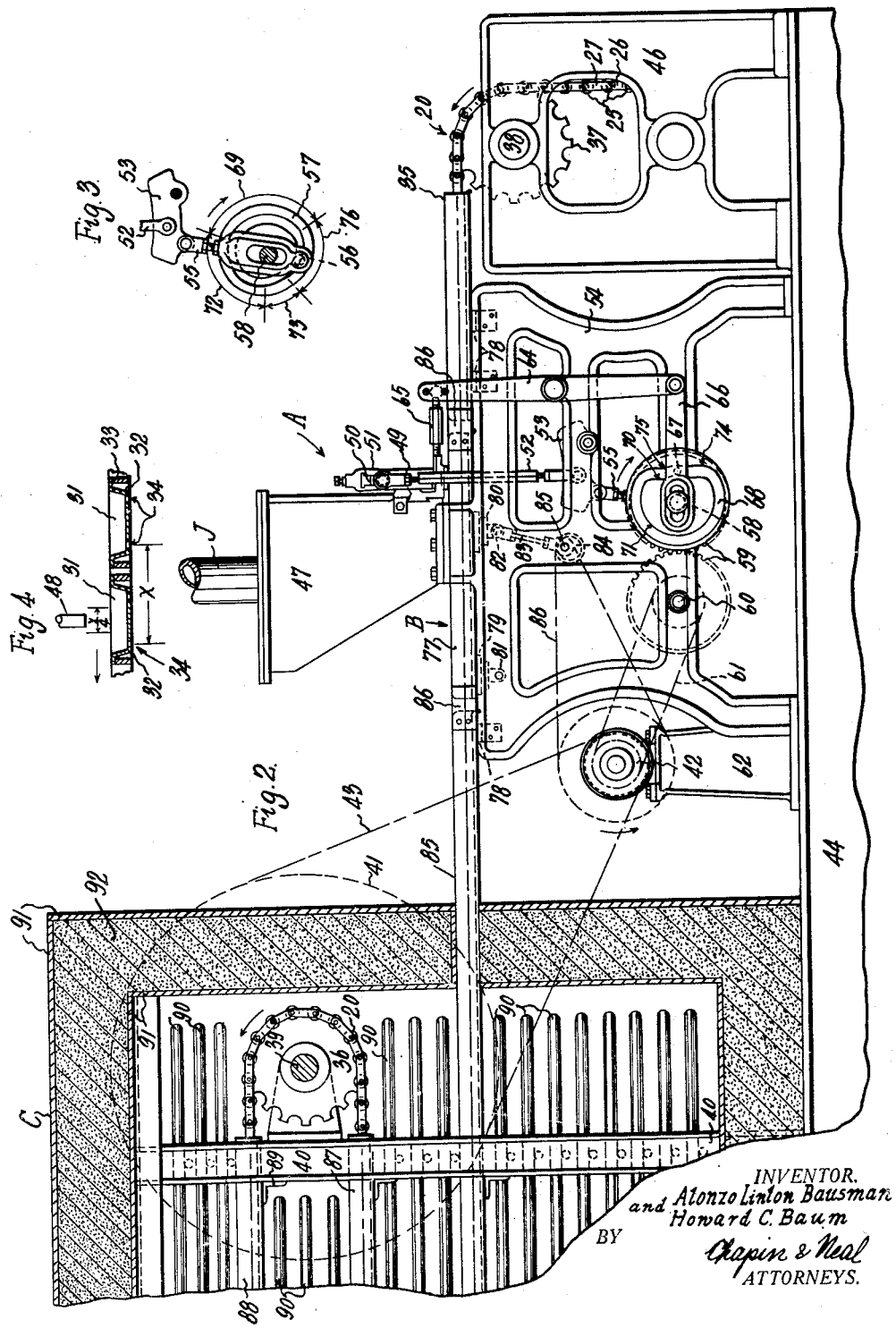

Inventors
Alonzo Linton Bausman
and
Howard C. Baum
By
Chapin & Neal
Attorney

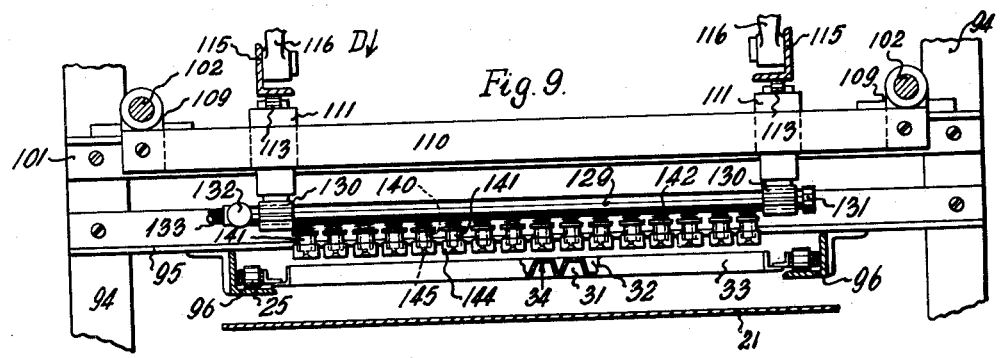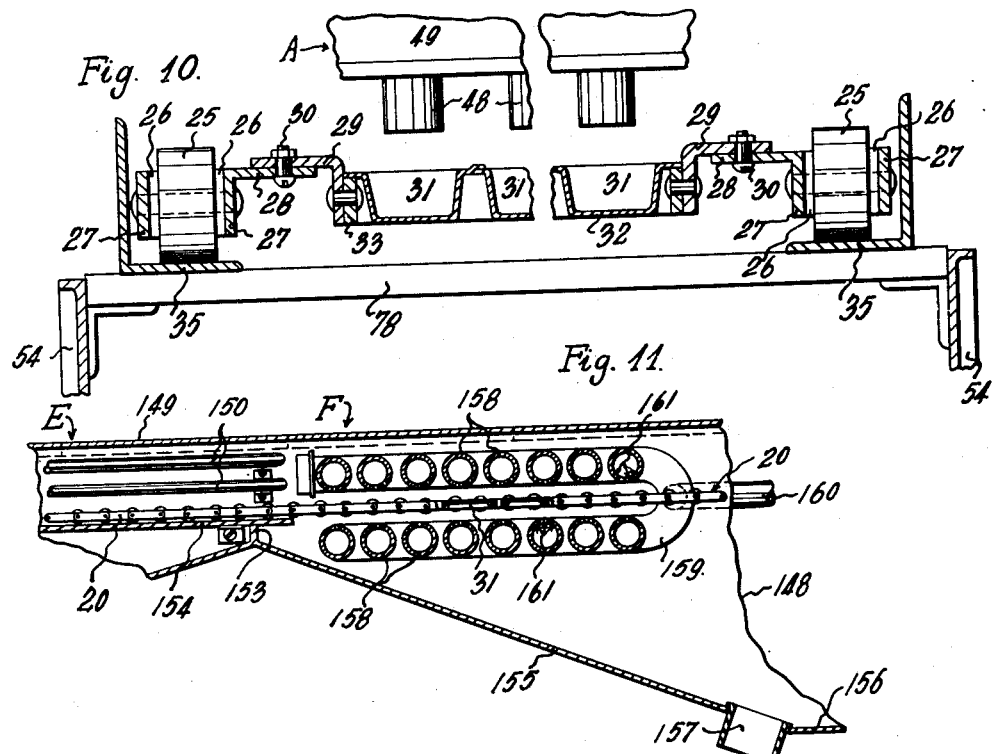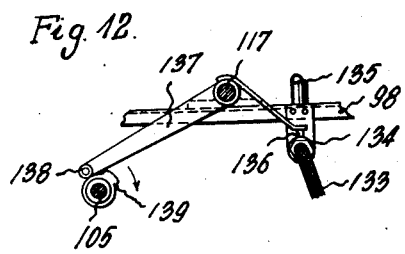

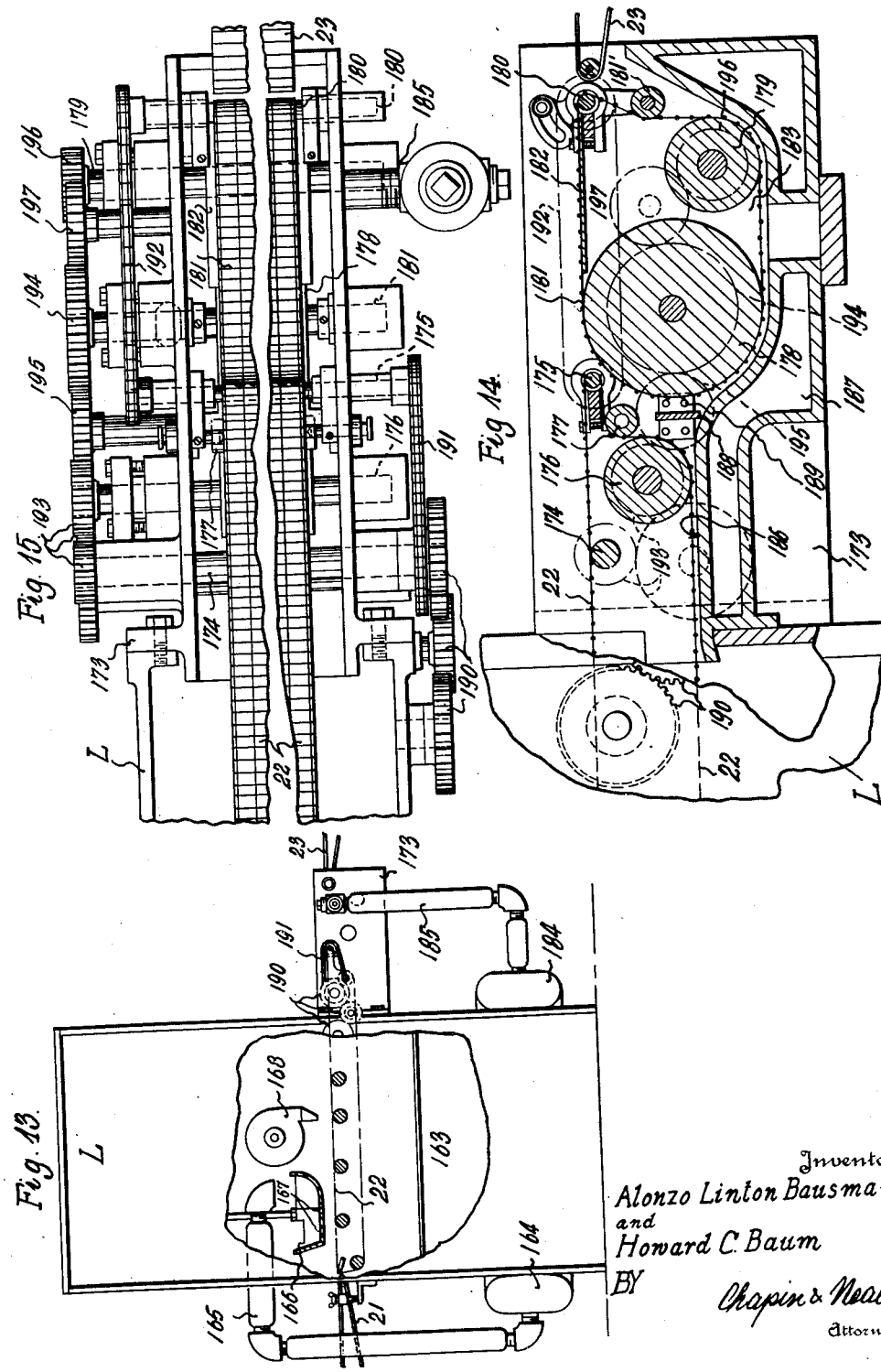

Patented Oct. 18, 1932

1,883,482

UNITED STATES PATENT OFFICE

ALONZO LINTON BAUSMAN, OF SPRINGFIELD, MASSACHUSETTS, AND HOWARD C. BAUM, OF MOUNT VERNON, NEW YORK, ASSIGNORS TO NATIONAL EQUIPMENT COMPANY, OF SPRINGFIELD, MASSACHUSETTS, A CORPORATION OF MASSACHUSETTS

CONFECTION MAKING APPARATUS

Application filed January 28, 1930. Serial No. 424,122.

This invention relates to an improved machine for making coated confections. The machine is adapted to form the "center" or core of the confection as well as to apply the chocolate or other coating thereof.

A broad feature of novelty in the machine of this invention is that the centers, which are formed by molding, are carried away from the molding machine through an apparatus wherein the molded center is caused to set or harden, and are then delivered to a confection coating machine all in an automatic and preferably continuous manner. It is simply necessary to feed into the machine the coating material and the material from which the center is made, and these materials are automatically worked into the finished product,—a coated confection,—which is delivered from the machine without having been touched by human hands.

The machine has been developed as a sanitary means for making frozen confections,—such as a chocolate coated bar of ice cream. It is, however, equally capable of use in the manufacture of any other kind of coated confection which is susceptible to the same or equivalent treatment.

Aside from the feature of novelty, above set forth, there are various other important novel features, which relate to the means for removing the molded centers from their molds, and in the case of a frozen confection, preferably include a means for loosening the confection in its mold, as by warming the mold, preparatory to the ejection of the confection therefrom; to means for washing and drying the molds during their return from the ejecting means to the molding machine; and to means for recovering any confection which is not ejected from the molds.

Other objects will appear from the following description and be pointed out in the appended claims.

The invention will be disclosed with reference to the accompanying drawings, in which:—

Fig. 1 is a small scale elevational view of the complete machine;

Fig. 1a is a sectional elevational view showing on a larger scale the ice cream recovery section of the machine;

Fig. 2 is an elevational view, drawn to a much larger scale, showing the molding machine for casting the centers and the entrance end of the cooling apparatus wherein the molded centers are caused to harden or set;

Fig. 3 is a detail view of a part of the molding machine;

Fig. 4 is a fragmentary sectional view illustrative of the mold filling operation;

Fig. 5 is an elevational view showing the means for loosening the centers from their molds and ejecting them therefrom,—showing also the delivery end of the aforesaid cooling apparatus and the receiving end of a second cooling apparatus, which effects a cooling of the molded centers preparatory to the coating operation;

Fig. 8 is a sectional elevational view taken on the line 8—8 of Fig. 7;

Fig. 9 is a cross sectional view taken on the line 9—9 of Fig. 6;

Fig. 10 is a large scale, fragmentary cross sectional view illustrative of the construction of the molds and mold conveyer and the mounting of the latter;

Fig. 11 is a fragmentary sectional elevational view illustrative of the manner in which the empty molds are washed;

Fig. 12 is a sectional view taken on the line 12—12 of Fig. 6;

Fig. 13 is an elevational view, partly in section, of the coating apparatus;

Fig. 14 is a sectional view, drawn to a larger scale, showing the portion of such apparatus wherein the bottom coating is applied; and Fig. 15 is a plan view of Fig. 14.

Referring first to Fig. 1; an endless mold conveyer, shown conventionally at 20, is mounted to travel, preferably continuously, in a path which carries the molds successively through a molding machine A, a shaking table B, a tempering apparatus C, which for frozen confection work should be a refrigerating apparatus, a mold emptying means D, a confection recovery section E, a mold washing means F, a draining section G, from which the molds return through a drying section H to the molding unit A. The ice cream, in a semi-frozen state, is delivered from the freezers located on the floor I above the molding machine A through a chute J to such machine. The molds are filled at A; the molds are shaken at B to consolidate the material deposited therein; the ice cream is fully frozen in the apparatus C and the molds are emptied at D. The molded centers, ejected from their molds at D, fall through a short distance upon a conveyer 21, which carries the centers through a cold box K wherein the centers are again cooled to compensate for such warming up as they received during their travel through the apparatus D. The conveyer 21 transfers the centers to the pervious conveyer 22 of a coating machine L, wherein the centers are completely coated, usually with chocolate. The coated confections are delivered from conveyer 22 to a conveyer 23, which carries the articles through a cold box M, wherein the confections and coatings are hardened. The finished product, now ready for wrapping or packing, is delivered by conveyer 23 from the right hand end of the machine to the conveyer 24, which carries the articles to a wrapping machine or packing table accordingly as the articles are to be packed by hand or wrapped automatically.

The apparatus is so large that it is usually desirable to distribute parts of it on different floors. Conveniently, the freezers are located on the third floor I, the units A, B and C on the second floor N, and the units D, E, F, G, H, K, L and M on the ground floor O. The refrigerating machinery (not shown) which supplies the brine coils of the several cold boxes C, K and M, may be located in the basement P.

Figure 6:
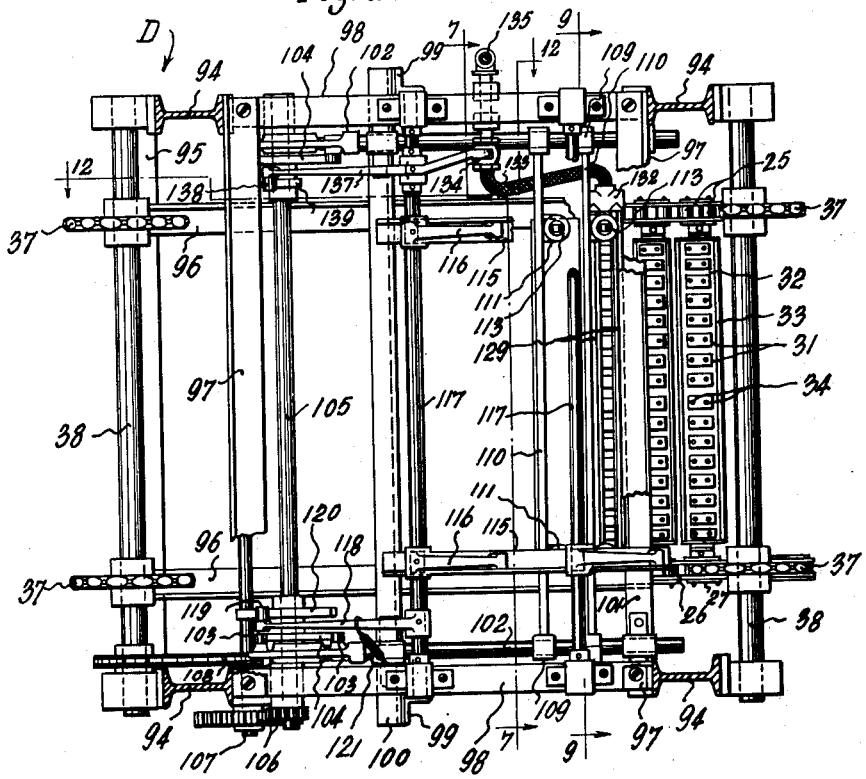
Fig. 6 is a plan view of the loosening and ejecting means.

The mold conveyer 20, comprises two laterally-spaced roller chains between which the several molds are carried. In Fig. 10, the rolls of the chains are shown at 25, the pairs of inner links at 26 and the pairs of outer links at 27. The links 27 on the inner side of each chain have right angularly turned lugs 28 to each of which an angle iron lug 29 is pivotally connected by a stud 30. A plurality of molds 31 (sixteen as shown in Fig. 6) are formed in a pressed metal member 32, secured to a hollow rectangular frame 33 fastened at its ends, one to each of an opposed pair of the angle irons 29. These molds are clearly shown in cross section in Fig. 10 and in longitudinal section in Figs. 4 and 8. From Fig. 4, it will be seen that there are two small holes 34 through the bottom wall of each mold 31. There are a large number of these mold frames and they are closely spaced on their chains 20 as shown in Fig. 6,—being connected to alternate links of the same. The rolls 25 of the chains ride on suitable trackways, such as those shown at 35 in Fig. 10, being the trackways of the molding machine A.

Each chain of the mold conveyer is trained over a driving sprocket 36 (Fig. 1) and a series of idler sprockets 37, these sprockets being mounted in pairs on shafts 38, in the manner shown in Fig. 6, and the shafts being variously supported in any suitable way. The driving sprockets 36 (Fig. 2) are fixed to a shaft 39 which is supported near its ends in bearings carried by one of a series of pairs of upstanding channel irons 40, forming part of the frame of the cold box C. This shaft at one end extends outside the cold box and carries a sprocket 41, driven continuously from an electric motor 42 by a chain 43.

The several sprockets so direct the mold conveyer that it passes through the unit A in a horizontal path; thence in the same path into cold box C and nearly to the remote end thereof, whence it returns in an overlying horizontal path toward the entrance end of unit A, whence it again turns and passes in an overlying horizontal path to the remote end of unit C; thence in a vertically downward path to unit D; thence in a horizontal path through unit D; thence upwardly and then in a horizontal path through the sections E, F and G in which path the molds are inverted; thence backwardly in an underlying path to right the molds and drain the bottoms thereof; thence forwardly to again invert the molds and drain the same; and thence horizontally through section H and then vertically upward to the molding machine.

The latter and the cold box C are mounted on longitudinally disposed I-beams 44, which rest on a series of transverse I-beams 45 resting on floor N. The beams 44 also serve to support pedestals 46, which are disposed adjacent the molding machine A and carry one of the idler sprocket shafts 38.

Referring to Fig. 2, the molding machine A may be a standard "depositor" except that the continuously operable mold conveyer 20 is substituted for the usual intermittently operable tray conveyer thereof and the step by step driving mechanism for the latter is dispensed with. From the supply hopper 47, into which ice cream in a semi-frozen condition is delivered by chute J, the material is drawn out in measured charges by a series of pumps and ejected through nipples 48 (see also Figs. 4 and 10) into the underlying molds 31. The pump cylinders are contained in the body 49 shown in Figs. 2 and 10. The several piston rods of the pumps are carried by a common cross bar 50 (Fig. 2), mounted to reciprocate vertically in guides 51 carried by hopper 47. Each end of bar 50 is connected by a link 52 to a lever 53, pivoted to the adjacent one of the pair of side frames 54, which support the hopper 47. Each lever 53 is connected to one end of a link 55 which carries a roll 56 (Fig. 3) to ride in a path cam 57. The cams 57 are fixed to a shaft 58, mounted at its ends in frames 54 and the links 55 are slotted, as shown in Fig. 3, to slide on the shaft as a guide. The shaft 58 is driven by spur gears 59 from a shaft 60, which in turn is driven continuously from motor 42 by a chain 61 and suitable sprockets, as indicated. The motor 42 may be carried by a pedestal 62 secured to beams 44. The valve action of the pumps is effected by a so-called "cut off bar", which is reciprocated in proper timed relation to the stroke of the pump pistons. The usual operating lever 64 and its link connection 65 for operating the cut off bar are shown in Fig. 2. Such lever is pivoted intermediate its ends to frame 54 and at its lower end is connected to a link 66, slotted to slide on shaft 58. Link 66 carries a roll 67 to ride in a path cam 68.

For a more complete disclosure of a depositor, operating generally in the same manner, reference is made to Carlson Patent No. 661,008, dated October 30, 1900. For the present purposes it should suffice to state that after the links 52 have effected the downward strokes of pump pistons (they are shown about half way down), they will come to rest due to the dwell portion 69 of cam 57. During this interval of rest of the pump pistons, the cut off bar will, due to the portion 70 of cam 68, be operated to close off the nipples 48 and connect the pump cylinders to hopper 47. The cut off bar then remains stationary, due to the dwell portion 71 of cam 68, while the part 72 of cam 57 causes the pump pistons to rise and draw in measured charges from hopper 47. The pistons dwell at the upper end of their strokes, due to the dwell portion 73 of cam 57, and at this time the cut off bar is actuated by the portion 74 of cam 68 to open the outlet nipples 48 and close communication between the pump cylinders and hopper 47. There is a dwell 75 on cam 68 to hold the cut off bar stationary during the down stroke of the pump pistons. Enough has been disclosed to show that the pistons and valve mechanism are operated in proper timed relation with each other and that they are driven by the mold conveyor.

The driving connections are such that shaft 58 makes one complete revolution, causing one complete cycle of operation of the depositor, while conveyer 20 is moving a distance equal to that between the center lines of two successive molds, or the distance $x$ shown in Fig. 4. The discharge from the nipples 48 is caused by the portion 76 of cam 57. Such portion is substantially 90 degrees in angular extent. Therefore, discharge from the nipples takes place intermittently during an interval of movement of the conveyer 20 equal to one quarter of the distance $x$. As shown in Fig. 4, the molds 31 are so located on the conveyer, with relation to the interval of discharge from nipples 48 (represented by the dimension $\frac{x}{4}$), that all of the discharge will be received in underlying molds 31 and so that the deposits will be spread to some extent due to the movement of the conveyer during the discharge interval.

The molds 31 pass successively along the shaking table B and are shaken both during and after filling. This table consists of angle iron trackways 77 which aline with the trackways 35 of the depositor and to which an up and down motion is imparted. The trackways 35 are supported on cross bars 78, the ends of which are secured to the side frames 54, as shown in Fig. 10. Similar cross bars 79 and 80 are connected to the pair of angle irons 77. Cross bar 79 carries bearings which are mounted to turn on a shaft 81, secured at its ends in side frames 54. Cross bar 80 carries a rod 82 to which are connected links 83, operated by eccentrics 84, fixed to a shaft 85. The latter is supported in frames 54, and is driven by a chain 86 from motor 42. It will be clear that the trackways 77, pivoted at 81, will be rapidly vibrated up and down by eccentrics 84 and that the molds 31, as they ride along these trackways, will be shaken and to the greatest degree at a point directly underneath the nozzles 48. This consolidates the material deposited in the molds and before it has time to set. The vibratory motion imparted to the molds is preferably rapid and shaft 85 is arranged to be driven much faster by the motor 42 than is the mold conveyer. Various other forms of wrapping devices could, of course, be used for the same purpose. The gaps between the vertical legs of angle irons 77 and the corresponding legs of the adjacent trackways 35 and the trackways 85 of cold box C may be bridged by plates 86, one set of which are secured to the trackways 85 and the other to trackways 77, as indicated.

The cold box C has three sets of parallel trackways 85, 87 and 88 arranged one above the other. These are secured to angle iron cross bars 89 and the cross bars are connected at their ends to channel iron uprights 40, the whole constituting a skeleton frame-work which rests upon the I-beams 44. This framework also carries bearings to support the shaft 39 of driving sprockets 36 (Fig. 2) and the shafts 38 of the two sets of idler sprockets 37 (Fig. 1). Brine coils 90 are also suitably supported from this framework, as indicated in Fig. 2, and are located below trackways 85, in the space between trackways 85 and 87, in the space between trackways 87 and 88 and also above trackways 88. These coils extend from end to end of cold box C. The framework, above described, is housed in by double walls 91 of sheathing between which is insulating material 92, such as cork for example. A vertical tunnel 93, constructed in the same general manner, extends from the delivery end of cold box C vertically downward to the emptying apparatus D. It is to be noted that the molds 31 in their first course of travel through cold box C travel right side up. By the time that the molds reach the end of such course of travel the cream therein has been frozen sufficiently so that the molds may be safely inverted, as is necessary with the described arrangement for the second course of travel.

Figure 7:
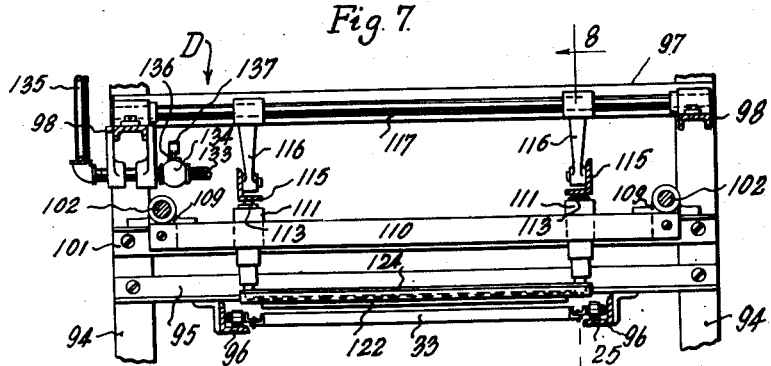
Fig. 7 is a cross sectional view taken on the line 7—7 of Fig. 6.

Referring now to Figs. 5 and 6, the emptying mechanism is mounted on a frame including two pairs of vertical I-beams 94 extending from floor O to floor N and secured to both. These beams carry bearings to support the shafts 38 of idler sprockets 37. Extending across between the beams 94 of each pair, are angle irons 95 which support angle iron trackways 96 for the mold conveyer (see also Fig. 7). The beams 94 of each pair are also connected together at a higher level by angle irons 97 and secured thereto are inverted channel irons 98, which extend from each beam 94 of one pair to the corresponding beam of the other pair. Secured at its upper end to each channel iron 98 and depending therefrom are two angle irons 99, which are connected together at their lower ends by an angle iron 100. A similar angle iron 101, arranged at the same level, connects the right hand pair of I-beams 94.

Mounted in bearings, carried by angle irons 100 and 101, for horizontal movement are two laterally-spaced members 102. The left hand end of each member 102 carries two rolls 103, which engage the periphery of a heart cam 104 at diametrically opposite points. Cams 104 are fixed to a shaft 105, mounted in bearings secured to the left hand pair of beams 94. The members 102 are slotted, as indicated, to slide on shaft 105. Shaft 105 is connected by spur gearing 106 to a shaft 107, also mounted in the last named bearings, and shaft 107 is driven by a chain 108 and suitable sprockets from the adjacent shaft 38 of the mold conveyer. The driving connections between shafts 38 and 105 are such as to turn the latter one complete revolution while the former moves the mold conveyer by the distance $x$ heretofore referred to. The heart cam, of course, produces uniform motion of members 102 and the speed of the latter is equal to that of the molds. The travel of such members is, however, only half the distance $x$.

The members 102 have fixed thereto, in longitudinally spaced relation, depending arms 109 (two as shown although others may be added if necessary as will appear). Each arm 109 on one member 102 is connected to the correspondingly located arm on the other member by a cross bar 110. Secured to each bar 110 in laterally spaced relation are two cylinders 111 in which plungers 112 (Fig. 8) are mounted for vertical sliding movement. The upper ends of the plungers carry rolls 113 and the plungers are urged upwardly by springs 114. These plungers are arranged to be simultaneously depressed by the following means. A pair of laterally-spaced, longitudinally disposed, angle irons 115 are provided, each overlying the rolls of two of the plungers in such a way as to maintain contact while the plungers are being moved back and forth by the heart cam. Each angle iron is suspended by two links 116, fixed one to each of two cross shafts 117, each of which is rotatably supported near its ends in bearings on channel irons 98. Fixed to one of these shafts is a lever 118, carrying at its free end a roll 119, riding on the periphery of a cam 120, fixed to shaft 105. When roll 119 is riding on the high portion of cam 120, the angle irons 115 and plungers 112 will be depressed and, when riding on the low portion, the plungers will rise to the limit permitted. The angle irons 115 are preferably lifted by a separate spring 121.

It will thus be clear that the plungers 112 have a vertical as well as a horizontal reciprocating movement. The plungers are shown at the right hand end of their horizontal movement and elevated. During the next half revolution of cam 104 the plungers will move horizontally to the left while they remain elevated. Shortly after the plungers start their horizontal movement to the right, the leading end of the high part of cam 120 will engage roll 119 and cause the plungers to be depressed and they are held depressed for a substantial part of such horizontal movement, rising shortly before the plungers reach the extreme right hand positions illustrated.

One pair of plungers 112 (Figs. 7 and 8) carries a box-like mold-engaging element 122, containing electric heating elements 123 (Fig. 8). The element 122 is long enough and wide enough to overlie the entire area of all the bottom walls of all the molds 31 contained in one mold frame 33. As shown in Fig. 8, the molds 31 are inverted so that the bottom walls lie adjacent element 122.

Consequently, when this element is depressed into engagement with such walls, the latter will be warmed to loosen the ice cream bar $p$ in its mold. It will be understood that the heating elements 123 can be connected to a source of electrical supply and controlled in any suitable manner, not necessary to illustrate herein.

The cover 124 of element 122 is detachably secured thereto, as indicated. Also secured to the cover are two laterally-spaced upstanding pins 125, each of which is slidably mounted in the lower end of a sleeve 126. The lower end of each plunger 112 is fixed in the upper end of one of these sleeves 126. A pin 127, passing transversely through each pin 125, enters vertical slots in the sleeves, whereby to limit the extent of sliding movement of pins 125. A spring 128, housed in each sleeve 126, tends to force its pin 125 downwardly to the limit permitted by the slot in sleeve 126. The latter also serves by abutment with the base of cylinder 111 to limit the upward travel of the plunger 112 under the action of its spring 114. As plunger 112 is depressed by the means above described, the element 122 travels therewith until it engages the bottom walls of the underlying molds, after which any further travel of the plungers is absorbed by the springs 128.

The other pair of plungers 112 carry between them a pair of transversely disposed pipes 129 which are mounted horizontally and in spaced parallel relation,—the center to center distance between these pipes being equal to the center to center distance between the two holes 34 in each mold 31 (Fig. 8). These pipes are held between two pairs of clamps 130 and the upper member of each clamp is fixed to the lower end of a plunger 112. One end of each pipe is closed by a cap 131 (Fig. 9) and at the other end each pipe is fixed in a common manifold 132 (Fig. 6) which is connected by a flexible pipe 133 to a valve 134. The latter is suitably supported, as indicated in Fig. 12, from one of the inverted channel irons 98. Also connected to valve 134 is a pipe 135 leading to a suitable source of fluid under pressure, such as compressed air. This valve is of the self closing type, having a plunger 136 which, when depressed from the position illustrated in Fig. 12, will open the valve and admit air under pressure to pipes 133 and 129. As a means for opening the valve, a lever 137 is mounted at a point intermediate its ends to turn freely on one of the shafts 117. One end of this lever overlies valve plunger 136, while the other end carries a roll 138 to ride on the periphery of a cam 139, fixed to the same shaft 105 which carries the cams 104 and 120. Cam 139 is so constructed, and so located on shaft 105 relatively to the last named cams, as to open the air valve 134 after the cam 120 has lowered the several plungers 112,—also to hold the valve open during the necessary part of the horizontal travel of the plungers to the right (as viewed in Fig. 5) and to close the valve before these plungers 112 begin to rise. The time during which the valve is held open may have to be varied to suit different conditions but the valve should not open until the plungers 112 have been lowered and it should close before the latter begin to rise. If found necessary or desirable, the heating elements 123 might be controlled in an analogous manner.

Referring to Figs. 8 and 9, each of the air pipes 129 has fixed thereto a plurality of vertically depending nipples 140, one for each of the molds 31 in a mold frame 33, and so spaced that their axes coincide with the axes of the holes 34 in the underlying molds 31. Slidable on each nipple 140 is a closely fitting sleeve 141, the upper end of which is urged downwardly by a spring 142. A cross pin 143, fixed in each nipple, has its ends disposed in vertical slots in the encompassing sleeve, whereby to limit the extent of downward movement of the sleeve by spring 142. Fixed to the lower end of each sleeve is a rubber piece 144 which has an axial opening 145 therethrough. It will be clear that as the right hand plungers 112 descend, the rubber pieces 144 will be tightly pressed against the underlying walls of the several molds 31 in the mold frame 33 and that the holes 145 therein will register with the holes 34 in the molds. As the plungers are then travelling in the same direction and at the same speed as the molds, communication between the registering holes will be maintained during the period when the air valve 134 is opened by cam 139. Air pressure will then act on the ice cream bars $p$ and eject them from their molds,—the ejected bars falling a short distance upon an underlying belt 21, as indicated in Fig. 8.

Provision has been made, as will be clear from Fig. 5, so that additional air ejectors, such as just described, or additional heating devices, may be installed on the reciprocating members 102. These members are long enough to receive two more pairs of cylinders 111 and another heating device or another ejector may be provided, as may be found necessary to secure the intended results under different conditions which may be encountered.

It is also to be noted that the step of loosening the bars $p$ from their molds may, according to many features of the invention, be accomplished by any suitable means which will warm the molds in a satisfactory manner, and it is not intended to restrict the invention to the particular electric heating means disclosed. For example, blasts of hot air, or any other suitable heating medium might be directed on the molds for this purpose. In the case of hot air, an arrangement like that of the air ejectors may be used,—the parts 141, 142 and 144 being omitted from the nipples 140. This arrangement would result in the delivery of intermittent blasts of hot air under the control of a valve, similar to valve 134. The intermittent character of the heating, while important and preferred, is not however, necessarily essential for all purposes.

It should be pointed out here that the heart cam 104 is so constructed that the length of the horizontal stroke of members 102 is half the dimension $x$, i. e., the center to center distance between successive molds on the mold conveyer. If the air ejectors and heating member 122 are originally set to properly engage the molds on the mold conveyer, they will remain in such relation. Consider that one row of holes 145 are in registration with one row of holes 34 in the molds at the start of the horizontal stroke of members 102 toward the right (as viewed in Figs. 5 or 8), these holes remain in registration while such horizonal stroke is effected,—the members 102 and the mold moving in the same direction and at the same speed through the distance $\frac{x}{2}$. Next, the members 102 move backward relatively to the mold but at the same rate of speed so that as the mold moves forward an additional distance equal to $\frac{x}{2}$, the members 102 will have moved a like distance in the opposite direction, making a total relative movement equal to $x$, thereby bringing each particular row of outlet holes 145 back into position to register with the corresponding row of holes 34 in the next succeeding mold on the mold conveyer.

The mold conveyer, after the molds 31 have been emptied, travels upwardly from the emptying station D and thence horizontally, as shown in Fig. 1. The mold conveyer, during such horizontal travel, and the ensuing travel necessary to reach the mold filling station, is enclosed by a housing 148 which preferably includes a series of removable top wall sections or covers 149. Under some conditions of operation, especially where the accelerated drying of the washed molds, as later described, is not needed or desired, these covers may be removed, except possibly those over the washing station F.

The first section of the housing 148 (from the left hand end to the washing station F) constitutes the ice cream recovery station E. Steam coils 150 (Fig. 1a) are suitably supported, as indicated, in the upper part of the housing above the path of travel of the mold conveyer. The lower wall of the housing is made up of sections sloping to a common point, forming a sump 151, to which is connected an outlet pipe 152. A baffle 153 extends upwardly from one end of sump 151 to the angle iron trackways 154 of the mold conveyer, in order to guard against water from the washing station F reaching the recovery section of the machine. The molds 31 travel upside down beneath the heating coils 150 and any particles of ice cream clinging to the molds, or any unejected bars of ice cream therein, are melted down and fall onto the floor of sump 151. The melted ice cream will flow to pipe 152 which conducts the same to any suitable container at any desired point. Unless this recovery means were provided, ice cream might sometimes be wasted by being washed into the sewer at the washing station F. For example, emergencies may arise where, due to failure of electric current or the supply of compressed air, the ice cream bars will not be ejected and, before such trouble is discovered and the apparatus shut down, much ice cream might be lost except for the described recovery means.

At the washing station F, the housing 148 has a lower wall 155 which slopes steeply downwardly from a point near baffle 153 and meets another floor 156, sloping downwardly from the extreme right hand end of the housing 148. A drain pipe 157 is connected to the bottom wall 155 near its junction with wall 156. Overlying these walls 155 are upper and lower series of transversely disposed pipes 158 between which the mold conveyer passes. Referring now to Fig. 11, the pipes 158 of both series are connected to a common manifold 159 and this in turn is connected to a pipe 160 which supplies hot water. In the under side of the pipes of the upper series and in the upper sides of the pipes of the lower series are jet orifices 161 to direct jets of hot water in various radial directions so as to reach all parts of the molds for washing the same. It will be noted that both the inside and outside of each mold is thoroughly washed by the sprays of hot water. The bulk of the washing water is received on the floor 155 and passes at once to the drain pipe 157.

It is necessary, however, to thoroughly drain the molds and accordingly the floor 156 is provided to take care of the relatively small amounts of water which drip from the molds at the draining station G. At this station, the inside surfaces of the mold drain first as the mold conveyer carries the inverted molds from the pipes 158 towards the next encountered set of idler sprockets 37 (Fig. 1). The mold conveyer then turns backwardly, thus righting the molds and allowing the outer surfaces to drain, after which the conveyer turns forwardly and again inverts the molds to allow a final draining of the inner surfaces thereof.

The molds may in many cases dry sufficiently during their return travel through section H to the mold filling machine without any special provisions to accelerate such action. We may, however, accelerate the drying by forcing in hot air into the right hand part of the housing 148, as through the pipe 162, such air leaving the housing at any suitable point, as at the left hand end thereof.

The invention as thus far described, is complete in itself as a means for forming and delivering at any suitable point, or to any suitable means, molded centers and, more particularly, centers formed of frozen confection such as ice cream. Preferably, however, these centers are coated, commonly with chocolate. This coating operation may, according to some aspects of the invention, be accomplished by any suitable means. However, the problem of coating frozen confections presents some difficulties and, if the best results are to be obtained, such confections should be treated somewhat differently than they would in the usual operation of coating ordinary centers.

The ice cream bars $p$ should be thoroughly hard and well frozen before they enter the coating machine L. To this end, the bars ejected at station D upon belt 21 are carried by the latter through a cold box K before being delivered to machine L. Thus, any softening of the bars $p$, due to exposure to room temperature and to the action of heating and ejecting apparatus, is compensated for and the centers delivered to belt 22 are thoroughly hard, as they must be to withstand the heat encountered in the coating machine.

The coating machine, insofar as it concerns the operation of coating the tops and sides of the centers $p$, is of usual form. It is, or may be of the general type disclosed in U. S. Letters Patent No. 1,323,948, dated December 2, 1919. For the present purposes, it will suffice to state that coating such as chocolate. contained in a supply tank 163 in the base of the machine is forced by a pump 164 through a conduit 165 into the shower pan 166, from which it emerges through one or more slots 167 in a transverse stream or streams to coat the confections carried through the latter on the wire mesh belt 22. It is to be noted that the usual bottom coating rolls are omitted and that only the tops and sides of the confections are coated at this point. The usual fan for removing excess coating from the confections is shown at 168. The excess coating passes through the belt 22 and is returned to tank 163 for reconditioning in the usual manner.

The coating machine, as customary, is provided with a driving means of its own and all parts of the machine are suitably connected to be driven therefrom. It has been thought unnecessary to illustrate all the driving connections, as they are sufficiently suggested in the patent above referred to, with the exception of the drive for the wire belt 22 and one suitable drive for the latter is shown in Magniez Patent No. 735,890, dated August 11, 1903. The latter patent also shows a drive for the belts which feed confections to belt 22 and deliver coated confections therefrom and which in this case are the cold box belts 21 and 23, respectively. In Fig. 1, we have indicated shafts 169 and 170 extending from the machine L toward the remote ends of belts 21 and 23, respectively, and each carrying a worm 171 which drives a worm gear 172 on one of the supporting rolls of its belt.

Referring now to Figs. 14 and 15 and the means for bottom coating the confections, such means are preferably of the type disclosed in U. S. Letters Patent No. 1,493,423, dated May 6, 1924. For best results, however, such means are preferably arranged to apply the bottom coating after the confections have been otherwise completely coated and, to this end, we mount the bottom coating means in what is known as the "extension" of the coating machine. This extension is, or may be, a casting 173 secured to machine L and projecting horizontally therefrom on the delivery side thereof. Between the side walls and above the bottom wall of this casting the wire belt 22 extends,—certain of the supporting rolls for this belt such as 174 and 175, and the drive roll 176 and idler roll 177 being rotatably supported from said side walls. Also rotatably supported from said side walls are other rolls 178, 179 and 180 which support a second wire belt 181, the upper stretch of which is located forwardly and in continuation of the upper stretch of belt 22. Associated with belt 181 is a tension roll 181' adjustably supported in the usual manner as indicated. Underlying the upper stretch of belt 181 is a fixed plate 182. The lower wall of casting 173 is formed to provide a sump 183 into which chocolate from tank 163 is forced by a pump 184 and pipe 185 (Fig. 13). Chocolate, overflowing from this sump (Fig. 14), passes back by way of floor 186 to the main tank 163 of machine L. This floor 186 and the bottom wall of sump 183 are jacketed, as at 187, to permit the circulation of a suitable heating medium. The level of chocolate in sump 183 may be raised by the use of a weir, such as the cross bar 188, the ends of which are slidably received between pairs of gibs 189, secured to the inner side walls of extension 173. Bar 188 may be readily removed and replaced by another bar of different height.

The various rolls described may be driven from the coating machine in the following manner. The spur gear train 190 (Figs. 13 and 15) is part of the standard drive for the wire belt of a coating machine of this type and shaft 174 is driven by this train. Shaft 174 drives by a chain 191 and suitable sprockets the small end roll 175 and this in turn drives by a chain 192, and suitable sprockets on the back side of the machine, the end roll 180 of the bottoming apparatus. Also on the back side of the machine, there are spur gears 193 by means of which the drive roll 176 is driven from shaft 174 in the usual manner. The large roll 178 of the bottoming apparatus carries a gear 194 which is driven from the gear train 193 through an intermediate idler gear 195 and the drive roll 179 of the apparatus carries a gear 196 which is driven from gear 194 through the intermediary of an idler gear 197.

The roll 178 and wire belt 181 feed up coating material from sump 183 (of the same kind, quality and condition as is used for coating the tops and sides of the confections) and force the coating to travel over and along plate 182 until it reaches roll 180, from whence coating falls back into the sump. In this way, a thick stream of coating is maintained which moves in the same direction as the confections. The latter successively ride off belt 22 and are deposited on and carried along by this stream. The confections do not touch roll 178, belt 181 or plate 182 but ride upon the stream of coating,—being floated thereupon to their destination, which is the conveyer 23. This conveyer has a smooth hard finish and is impervious to the coating material. The articles, once they have been bottom coated by riding on the stream of coating, ride off onto the conveyor 23. Thus, the fresh bottom coating is adequately supported so that it can not fall off, as it can and often does if carried by a pervious belt before the bottom coating has hardened. The weight of the confections presses the freshly applied bottom coating against the smooth surface of belt 23 and smooths the same. The bottom surfaces are thus entirely free from wire marks or other imperfections. In coating frozen confections, such as ice cream bars, the heat exchange between the cold center and warm coating is so rapid that the coating congeals much more quickly than with ordinary confections. Hence, a bottom coating applied in the usual way in machine L (at a point beneath shower pan 166) may harden before reaching belt 23, to an extent such that the bottom coating cannot thereafter be smoothed out on belt 23 under the weight of the confections. Consequently, the marks of the wire belt 22 would show on the bottom coatings. Here, the final bottom coating is applied after the articles have left the wire belt and they are untouched by any wire belt during or after the bottom coating operation.

The cold boxes K and M have not been described in detail as they are well known in the art. Essentially, they form refrigerating chambers or tunnels through which the conveyers 21 or 23, as the case may be, travel. Examples of cold boxes suitable for the purpose will be found in U. S. Letters Patent Nos. 1,567,633 and 1,667,765 dated December 29, 1925 and May 1, 1928, respectively.

The operation of the apparatus will now be briefly described, as used in connection with the manufacture of frozen confections. The mold conveyer 20, travelling continuously, carries the mold frames 33 and the sets of molds therein, successively past and below the outlet nipples 48 of the pump cylinders of depositor A. The discharge from these cylinders is timed with respect to the mold conveyer so as to occur only while molds 31 underlie the nipples. The molds, then travelling right side up, become filled with ice cream and there is a spreading of the deposited material in the molds due to the movement of the molds during the interval of discharge of the pump cylinders. The filled molds in passing over the shaking table B are shaken while the deposits are taking place, whereby the ice cream is shaken down and consolidated in the molds before it has a chance to set. The molds then enter cold box C. In the latter, the filled molds travel right side up for an interval long enough to allow the ice cream to set sufficiently so that it will not fall out of the molds when the latter are inverted during their second course of travel through the cold box. The ice cream, originally deposited in a semi-frozen and more or less plastic state, becomes thoroughly frozen and hard by the time the molds leave the cold box C. In the case of some confections other than ice cream, a warming rather than a cooling operation may be performed in the part C. In either case, a temperature conditioning operation is effected after the casting of the confections and before the coating of the same. The molds then travel upside down through the emptying section D, where they are first successively heated by the elements 123, or any other suitable means, enough to loosen the cream from the molds, and then subjected to blasts of air, emitted from the passages 145 and passing through the openings 34 in the molds, to eject the ice cream. The ejected bars $p$ of ice cream fall upon belt 21 and are carried through the cold box K, where they are cooled to compensate for any warming up which may have occurred at the emptying station D. The belt 21 transfers the bars $p$ to wire belt 22 of coating machine L wherein the tops and sides of the bars are coated in the usual manner. After this coating operation, belt 22 delivers the bars successively upon a moving stream of coating material which flows over plate 182, whereby the bottoms of bars $p$ are coated. Immediately following the application of the bottom coatings, the bars $p$ are transferred to the smooth impervious belt 23 on which the bottom coatings are smoothed out and by which the confections, now completely coated, are carried through the cold box M for the final cooling operation. The ice cream will have softened somewhat during its travel through the warm casing of machine L and it is necessary to again harden up the cream, which work is performed by cold box M. The finished confections may be delivered by belt 23 to the conveyer 24 which may be the conveyer of a packing table or that of a wrapping machine.

The mold conveyer 20, after leaving the emptying station D, carries the molds successively through the ice cream recovery station E, the mold washing station F, the draining station G and the drying station H. Any ice cream, not ejected from the molds, is removed therefrom at E, where the molds are heated enough to melt any cream therein and the latter falls from the then inverted molds upon the sloping floor of the casing and flows into pipe 152. The empty molds are then thoroughly washed, both inside and out, by jets of hot water from pipes 158, after which they are drained at G, being turned over during their passage through this section to permit both sides of the molds to drain. The molds then travel through the section H where they are dried, either in the normal way or in an accelerated way by means of hot air forced into the casing at 162.

So far as we are aware, we are the first to provide for the formation of confection centers by molding, whether of ice cream or any other material requiring a temperature conditioning prior to coating, and the coating of the same in one continuous and wholly automatic operation. Heretofore, the centers have been molded in an automatic machine but they have had to be removed manually therefrom, set aside to harden and then manually supplied after the lapse of considerable time, to the coating machine. Here, it is simply necessary to supply the ingredients for the center and the coating material and everything else takes place automatically. The centers are automatically cast in molds, hardened, removed from the molds and carried to and through the coating machine without any interruption in their progression from one end of the apparatus to the other. Aside from the saving in expense due to elimination of hand labor, which is of course most important, there is also an important advantage in manufacturing the confections under much more sanitary conditions than can obtain where hand labor is employed.

The invention also solves an important problem insofar as its use in making frozen confections is concerned. Previously molded bricks of ice cream have been cut in slices and automatically fed to a coating machine but there has been a gap in the continuity of operations in that the molded bricks have had to be manually transferred to the cutting apparatus. Here the cutting operation is dispensed with and the molding machine is made to form the ice cream into bars of the desired size and shape and these bars are conveyed automatically to the coating machine.

The invention is also characterized by special means for loosening and ejecting the molded articles from their molds, by the provisions for recovering any ice cream not removed from the molds, by the washing, draining and drying means for the molds.

While we have shown the complete apparatus, which we prefer and consider important as being the best means for doing the stated work, we recognize that the invention may be utilized to advantage even though less than the complete apparatus is used. The apparatus might, for example, be used merely to form the centers which may or may not be coated and which, if coated, may be coated by means other than those herein shown and even by hand dipping. So also, there are features of the automatic coating machine which may be utilized to advantage even though the articles to be coated are formed in some other way or by some other apparatus. The mold emptying provisions may have an important use apart from other portions of the apparatus. These and other features may be used independently as well as conjointly. It is our intention that the various inventive features be covered in various combinations in the appended claims and in such ways as to protect them when used independently or conjointly.

What we claim is:

1. A confection making machine, comprising, a continuously movable conveying means carrying a series of molds, a receptacle for confection to be cast in said molds, means for intermittently ejecting through the outlet of said receptacle measured charges of confection, means for coordinating the movement of said conveying and ejecting means so that an intermittent ejection of confection occurs during each interval of movement of the conveying means wherein the mold moves in receiving relation to said outlet, a temperature conditioning apparatus through which the filled molds are carried by said conveying means and by which the molded confection is caused to set, means for emptying the molds after they leave said apparatus and while moving continuously with said conveying means, said emptying means comprising means moving with the molds during the emptying operation for positively removing the confections out of their molds and means for coordinating the operation of said emptying means with the movement of said conveying means.

2. Apparatus for continuously making coated frozen confections, comprising, conveying means carrying a series of molds, means for successively depositing in the molds charges of ice cream in a semi-frozen state, means for freezing the cream while in said molds, means for successively warming the molds to loosen the frozen cream therefrom, means for successively expelling the frozen cream from the molds from which it has been loosened, conveying means receiving the frozen confections as they are expelled, means for coating the frozen confections, means for chilling them preliminary to coating to compensate for the warming received prior to expulsion, and means for finally cooling the frozen confections, said last named conveying means carrying the confections through said preliminary and final cooling means and through said coating means.

3. Apparatus for making frozen confections, comprising, conveying means carrying a series of molds, means for successively depositing in the molds charges of confection in a semi-frozen state, means for freezing the confections while in said mold, means for removing the frozen confections from their molds, heating means operable on the molds after they leave the last named means and while the molds are travelling upside down to melt any confection which may be left therein, and means for collecting the melted down confection draining from said inverted molds.

4. Apparatus for making frozen confections, comprising, conveying means carrying a series of molds, means for successively depositing in the molds charges of ice cream in a semi-frozen state, means for freezing the cream while in said molds, a second conveying means, means for warming the molds to loosen the frozen confections in their molds, means for removing the frozen confections from the molds and transferring them to the second conveying means; a cooling means, a coating means and a second cooling means for the coated confections through which the confections are successively carried by the second conveying means.

5. In combination, a plurality of molds each having an opening in its bottom wall, conveying means for carrying the molds in a closed loop path in part of which the molds travel right side up and in other parts of which the molds travel upside down, means for filling the molds with confection while traveling right side up, means for solidifying the confection in the molds prior to their inversion, and means successively engageable with each inverted mold to direct a blast of fluid under pressure through the opening in said wall of the mold to eject the confection therefrom.

6. In combination, a plurality of molds each having an opening in its bottom wall, conveying means for carrying the molds in a closed loop path in part of which the molds travel right side up and in other parts of which the molds travel upside down, means for filling the molds with confection while travelling right side up, means for solidifying the confection in the molds prior to their inversion, and means successively engageable with each inverted mold to first warm the same to loosen the confection in the mold and then direct a blast of fluid under pressure through the opening in said wall of the mold to eject the confection therefrom.

7. The combination with a conveyer carrying molds filled with solidified confection and continuously movable through a path during part of which the molds travel upside down, each of said molds having an opening in its bottom wall, of a reciprocable member moving back and forth in a path parallel to and above that of the inverted molds and at substantially the same rate of speed; a conduit carried by said member and to which fluid under pressure is supplied, said conduit having an outlet movable toward and away from the inverted molds and adapted to communicate with said opening therein, and means for depressing said outlet into engagement with the mold while said member is moving in the same direction as the mold and raising it from the mold before said member commences its return stroke.

8. The combination with a conveyer carrying molds filled with solidified confection and continuously movable through a path during part of which the molds travel upside down, each of said molds having an opening in its bottom wall, of a reciprocable member moving back and forth in a path parallel to and above that of the inverted molds and at substantially the same rate of speed, a conduit carried by said member and to which fluid under pressure is supplied, said conduit having an outlet movable toward and away from the inverted molds and adapted to communicate with said opening therein, means for depressing said outlet into engagement with the mold while said member is moving in the same direction as the mold and raising it from the mold before said member commences its return stroke, a valve to control the admission of fluid under pressure into said conduit, and means to open said valve after said outlet has been engaged with a mold and to close the valve before said outlet has been disengaged from the mold.

9. The combination with a conveyer carrying molds filled with solidified confection and continuously movable through a path during part of which the molds travel upside down, each of said molds having an opening in its bottom wall, of a reciprocable member moving back and forth in a path parallel to and above that of the inverted molds and at substantially the same rate of speed, a conduit carried by said member and to which fluid under pressure is supplied, said conduit having an outlet movable toward and away from the inverted molds and adapted to communicate with said opening therein, a heating means also carried by said member and movable toward and away from the molds, and means for simultaneously depressing said outlet and heating means so that they engage adjacent molds while said member is moving in the same direction as the molds and for raising them before said member commences its travel in the opposite direction.

10. The combination with a conveyer carrying in equally and longitudinally spaced relation thereon molds filled with solidified confection and continuously movable in a path during part of which the molds travel upside down, each of said molds having an opening in its bottom wall, of a member reciprocable in a path parallel to and above that of the inverted molds and moving at a uniform rate of speed and at substantially the same rate as said molds, said member having a stroke equal to half the distance between the centers of successive molds and between the centers of the openings therein, a conduit carried by said member having an outlet portion movable toward and away from the bottom walls of the molds, said outlet arranged vertically in line with one of said openings when the molds and member are travelling in the same direction, means to depress said outlet portion into engagement with a mold while the member and mold are moving in the same direction and to raise said portion before the start of the return stroke of said member, and means to direct fluid under pressure through said outlet and registering opening during the engagement of said portion and mold.

11. In combination, a plurality of molds each having an opening in its bottom wall, conveying means for carrying the molds in a closed loop path in part of which the molds travel right side up and in other parts of which the molds travel upside down, means for filling the molds with confection while travelling right side up, means for solidifying the confection in the molds prior to their inversion, means for successively heating the inverted molds sufficiently to loosen the confections therein, and means successively engageable with each inverted mold to direct a blast of fluid under pressure through the opening in said wall of the mold to eject the confection therefrom.

12. The combination with a conveyer carrying molds filled with solidified confection and continuously movable through a path during part of which the molds travel upside down, each of said molds having an opening in its bottom wall, of a reciprocable member moving back and forth in a path parallel to that of the inverted molds and at substantially the same rate of speed; a plunger slidably mounted in said member and movable toward and away from the molds, a conduit to which fluid under pressure is supplied, said conduit carried by said plunger and having an outlet adapted to successively communicate with the openings in said molds, and means for advancing said plunger to carry said outlet into engagement with a mold while said member is moving in the same direction as the mold and for retracting it to separate the outlet from the mold before said member commences its return stroke.

13. The combination with a conveyer carrying molds filled with solidified confection and continuously movable through a path during part of which the molds travel upside down, each of said molds having an opening in its bottom wall, of a reciprocable member moving back and forth in a path parallel to that of the inverted molds and at substantially the same rate of speed; a plunger slidably mounted in said member and movable toward and away from the molds, a conduit to which fluid under pressure is supplied, said conduit carried by said plunger and having an outlet adapted to successively communicate with the openings in said molds, and means for advancing said plunger to carry said outlet into engagement with a mold while said member is moving in the same direction as the mold and for retracting it to separate the outlet from the mold before said member commences its return stroke, said last named means including a trackway paralleling the path of movement of said member and with which said plunger is slidably engaged.

14. The combination with a conveyer carrying molds filled with solidified confection and continuously movable through a path during part of which the molds travel upside down, each of said molds having an opening in its bottom wall, of a reciprocable member moving back and forth in a path parallel to that of the inverted molds and at substantially the same rate of speed; a plunger slidably mounted in said member and movable toward and away from the molds, a conduit to which fluid under pressure is supplied and which is carried by said plunger, said conduit having an independently-movable spring-projected outlet portion adapted to successively communicate with the openings in said molds, and means for moving said plunger to carry said outlet portion into engagement with a mold while said member is moving in the same direction as the mold and for retracting said plunger to separate said outlet portion from the mold before said member commences its return stroke, said spring-projected outlet portion yielding after engagement with the mold enabling continued travel of the plunger and tight engagement of the outlet portion with the mold.

15. In combination, a plurality of molds each having an opening in its bottom wall, conveying means for carrying the molds in a closed loop path in part of which the molds travel right side up and in other parts of which the molds travel upside down, means for filling the molds with confection while travelling right side up, means for solidifying the confection in the molds prior to their inversion, and means successively engageable with each mold while inverted to effect the ejection of the confection therefrom by the action of fluid pressure through said opening.

In testimony whereof we have affixed our signatures.

ALONZO LINTON BAUSMAN.
HOWARD C. BAUM.